United States Patent [19]

Bernard et al.

[11] Patent Number: 5,524,485
[45] Date of Patent: Jun. 11, 1996

[54] TORQUE/POSITION TRANSDUCER

[75] Inventors: Thomas R. Bernard, Baton Rouge; Jan M. Bullock, St. Amant, both of La.

[73] Assignee: Southern Valve Service, Inc., Prairieville, La.

[21] Appl. No.: 374,846

[22] Filed: Jan. 19, 1995

[51] Int. Cl.⁶ ................................................. G01M 19/00
[52] U.S. Cl. ........................................ 73/168; 73/862.191
[58] Field of Search ................................ 73/168, 862.191, 73/862.635, 862.338

[56] References Cited

U.S. PATENT DOCUMENTS

| | | | |
|---|---|---|---|
| 4,498,336 | 2/1985 | Dalton | 73/168 |
| 4,570,903 | 2/1986 | Crass | 73/168 X |
| 4,759,224 | 7/1988 | Charbonneau et al. | 73/168 X |
| 4,787,245 | 11/1988 | Anderson et al. | 73/168 |
| 4,977,782 | 12/1990 | Stohr et al. | 73/168 X |
| 5,029,597 | 7/1991 | Leon | 73/168 X |
| 5,197,338 | 3/1993 | Heiman et al. | 73/168 X |
| 5,199,301 | 4/1993 | Bauer | 73/168 |
| 5,239,874 | 8/1993 | Hale | 73/168 X |
| 5,396,167 | 3/1995 | Leon | 73/168 X |
| 5,430,368 | 7/1995 | Leon | 73/168 X |
| 5,432,436 | 7/1995 | Leon et al. | 73/168 X |
| 5,433,245 | 7/1995 | Prather et al. | 73/168 X |

Primary Examiner—Richard Chilcot
Assistant Examiner—Elizabeth L. Dougherty
Attorney, Agent, or Firm—Michael A. O'Neil

[57] ABSTRACT

A torque/position transducer is positioned between the valve stem of a valve and a valve operator adapted to open and close the valve and includes a body including an input lug adapted for mating the engagement with the output lug of the valve operator and an output lug adapted for mating the engagement with the valve stem of the valve. A plurality of strain gauges are mounted on the body of the torque/position transducer and function to generate an output signal indicate of the amount of torque necessary to open or close the valve. The torque/position transducer further includes a movable ring secured to the body for rotation therewith under the action of the valve operator and a fixed ring rotatably received on a reduced diameter portion of the movable ring and secured against rotation under the action of the valve operator. An infrared signal generator on the movable ring directs a signal into engagement with a reflective tape on the fixed ring which is reflected to an infrared detector also mounted on the movable ring to generate an output indicative of the positioning of the valve under the action of the valve operator.

6 Claims, 3 Drawing Sheets

TORQUE/POSITION TRANSDUCER

TECHNICAL FIELD

The present invention relates generally to torque/position transducers, and more particularly to a unique torque/position transducer that is particularly adapted for use in conjunction with valves and operators therefore.

BACKGROUND AND SUMMARY OF THE INVENTION

At the present time, valves such as those employed in petroleum pipelines and the like are typically not manually operated. Rather, such valves are opened and closed utilizing valve operators. Valve operators for pipeline valves typically comprise an electric or fluid operated motor and a speed reducer which operate in combination to provide the output torque necessary to open and/or close the valve.

It has been determined that the torque necessary to open or close a valve is indicative of the operating condition of the valve. It is therefore useful to measure the torque necessary to operate the valve as a function of the operational status of the valve which in turn predicts the time remaining before the valve must be either serviced or replaced. The measurement of the torque necessary to operate the valve is a function of the positioning of the valve, with the highest torque requirement usually occurring at the start of the valve opening or closing operation.

SUMMARY OF THE INVENTION

The present invention comprises a torque/position transducer which is located between the valve operator for and the valve stem of a valve and which functions to generate an output indicative of the torque necessary to open or close the valve and the positioning of the valve when the torque measurement is made.

In accordance with the broader aspects of the invention, the torque/position transducer comprises a body including an input lug which mates with the output lug of the valve operator and an output lug which mates with the valve stem of the valve to be opened or closed. Intermediate to the input and output lugs of the body is a cylindrical section comprising a mounting surface for a plurality of strain gauges. The strain gauges are mounted at spaced points around the periphery of the cylindrical section of the body and are preferably arranged at an angle with respect to the axis thereof to provide an output indicative of the torque that is transferred from the valve operator to the valve stem.

The torque/position transducer further includes a pair of interlocking rings which are mounted on the body in an overlapping relationship with respect to the cylindrical section thereof. The interlocking rings include a moving ring which is secured to the body of the torque/position transducer for rotation therewith under the action of the valve operator. The interlocking rings also include a fixed ring which has a projecting lug that engages a bracket to prevent rotation thereof.

The fixed ring has a reflecting surface internal thereto which functions to reflect an infrared beam generated from within the moving ring back to an infrared receiver. In this manner, there is generated an output indicative of the positioning of the valve under the action of the valve operator.

BRIEF DESCRIPTION OF DRAWINGS

A more complete understanding of the present invention may be had by reference to the following Detailed Description when taken in conjunction with the accompanying Drawings, in which.

DETAILED DESCRIPTION

Figure 1:
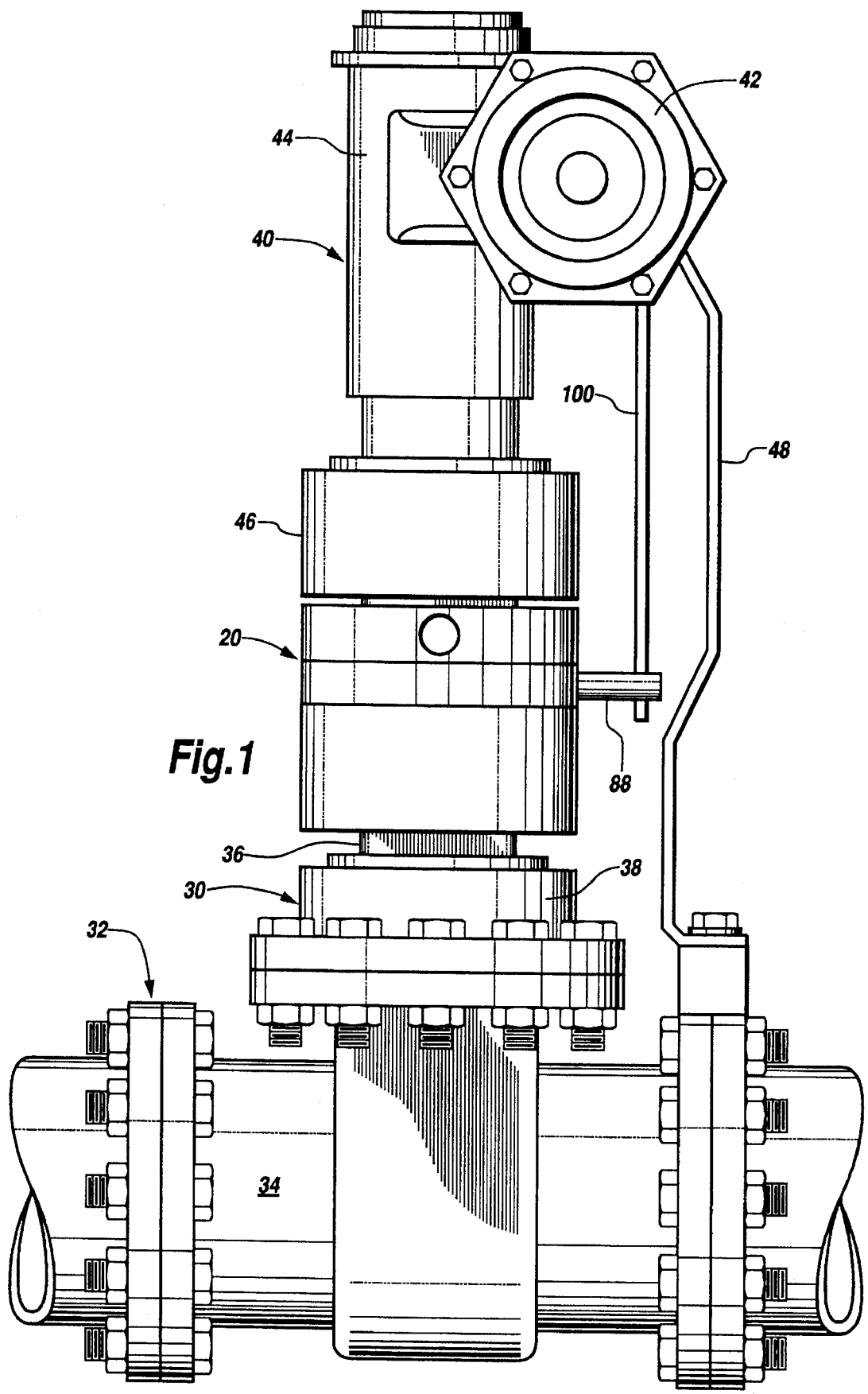
FIG. 1 is a side view of a torque/position transducer incorporating the present invention shown in its operating environment.
Figure 2:
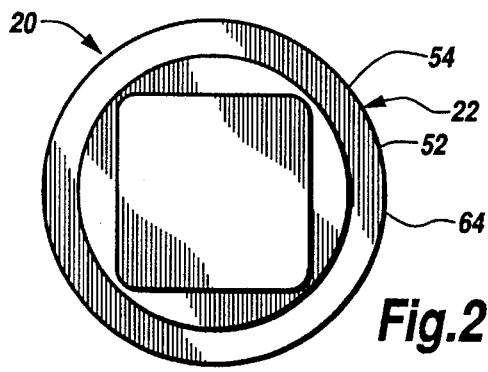
FIG. 2 is a top view of the body of the torque/position transducer of FIG. 1.
Figure 6:
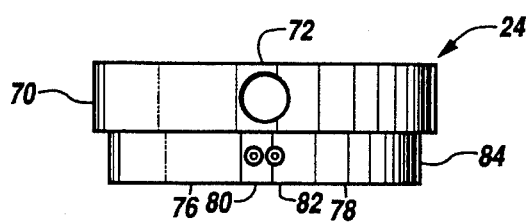
FIG. 6 is a side view of one of the interlocking rings of the torque/position transducer of FIG. 1.
Figure 3:
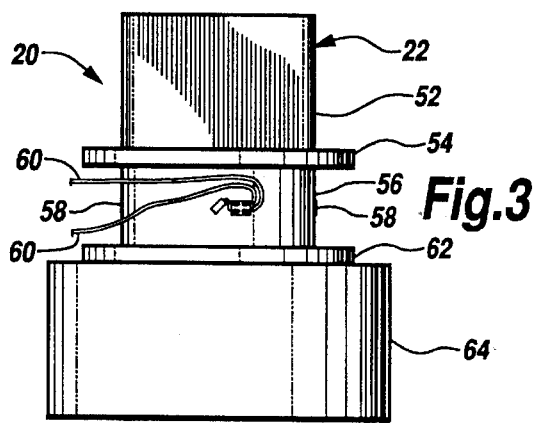
FIG. 3 is a side view of the body of FIG. 2.
Figure 7:
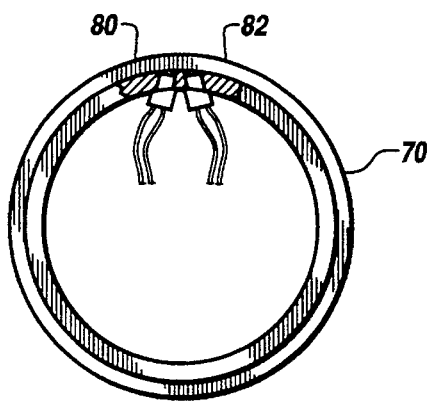
FIG. 7 is a top view of the interlocking ring of FIG. 6.
Figure 4:
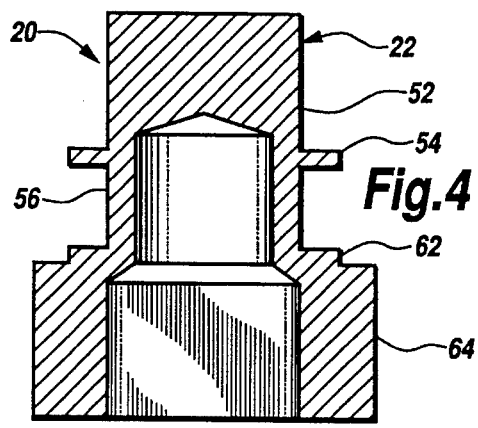
FIG. 4 is a longitudinal sectional view of the body of FIG. 2.

Referring now to the drawings, and in particular to FIG. 1 thereof, there is shown a torque/position transducer 20 incorporating the present invention. In FIG. 1, the torque/position transducer 20 as shown operably connected between a valve 30 and a valve operator 40. The valve 30 is positioned in a pipeline 32 and comprises a valve body 34. The valve contained within the valve body 34 is actuated by a valve stem 36 extending from a packing housing 38 at the upper end of the valve body 34.

The valve operator 40 comprises a motor 42 which may be either manual, electric or fluid operated. Typically, the motor 42 will be hydraulically driven. The motor 42 has an output which is operably connected to a speed reducer 44. The speed reducer 44 in turn drives an drive lug 46. The valve operator 40 is supported above the valve 30 on a bracket 48.

Figure 10:
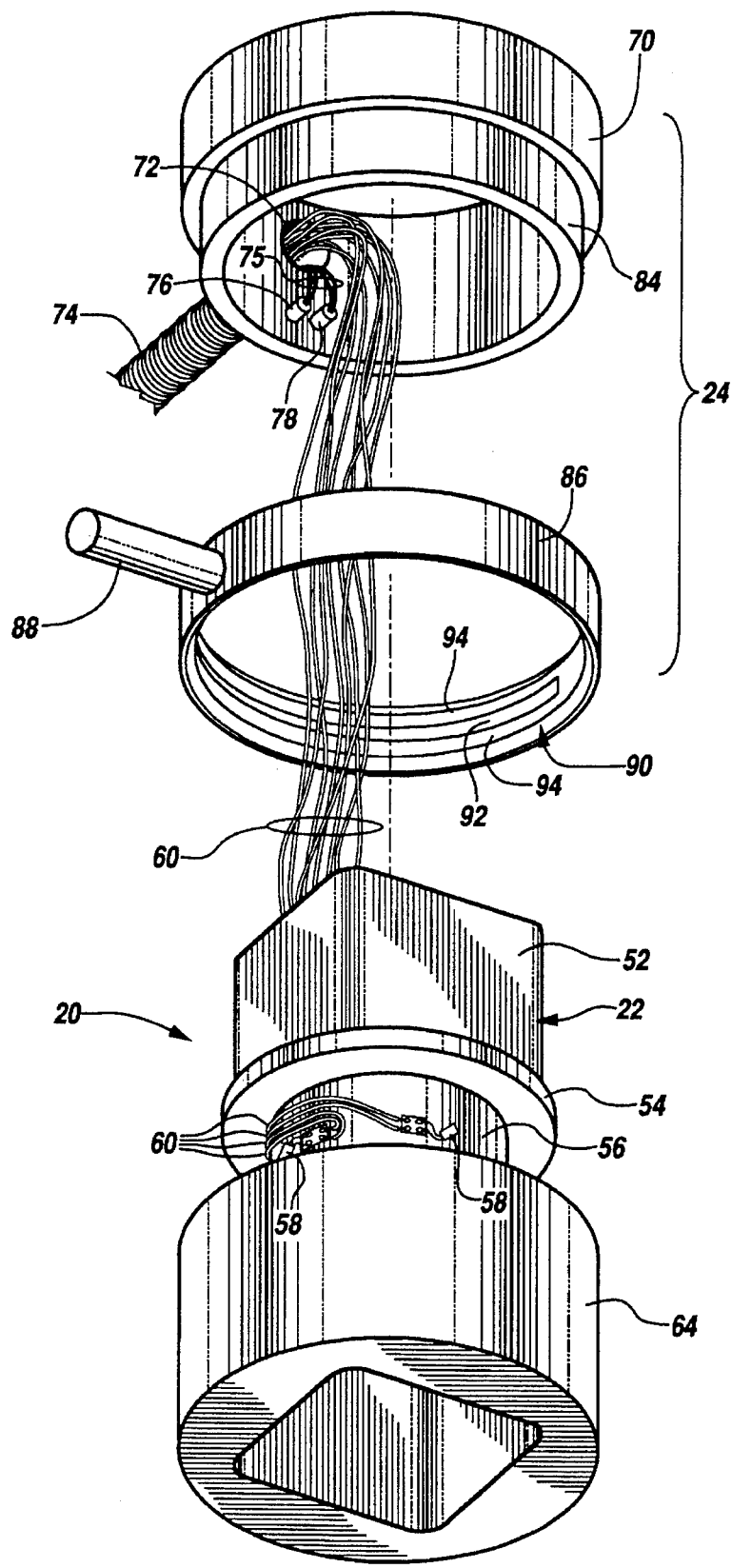
FIG. 10 is a perspective view of the torque/position transducer of the present invention in which the component parts thereof are shown in a longitudinally exploded orientation.

Referring now to FIG. 10, the torque/position transducer 20 of the present invention comprises a body 22 and a pair of interlocking rings 24 which are ordinarily telescopingly received around the body 22. As is best shown in FIGS. 2 through 5, the body 22 of the torque/position transducer 20 includes an upper input lug 52 which is square in cross-section. The lug 52 extends to a flange 54 which in turn extends to a cylindrical section 56. The cylindrical section 56 has a plurality of strain gauges 58 mounted thereon.

The torque/position transducer 20 comprises a plurality of strain gauges 58 mounted at spaced apart locations around the periphery of the cylindrical section 56 of the body 22. The strain gauges 58 are preferably angularly disposed relative to the axis of the body 22, and an orientation of 45 degrees with respect to the axis of the body 22 is preferable. Each of the strain gauges 58 has a pair of output leads 60 which are directed from the strain gauge to appropriate circuitry which is used to combine and average the output of the several strain gauges 58 comprising the torque/positioning transducer 20 to provide an output indicative of the torque applied thereto.

The cylindrical portion 56 of the body 22 extends to a second flange 62 which in turn extends to an output lug 64. In the normal usage of the torque/positioning transducer 20, the lug 52 is engaged with the drive lug 46 of the valve operator 40, and the lug 64 is engaged with the valve stem 36 of the valve 30. Thus, the body 22 functions to transfer torque from the valve operator 40 to the valve 30.

As will be apparent, to the extent the drive lug 46 of the valve operator 40 rotates in advance of the valve stem 36 of the valve 30, the body 22 of the torque/positioning transducer 20 is distorted. Any distortion of the body 20 results in deformation of the strain gauges 58 which in turn causes strain gauges 58 to generate a variance in voltage. The strain gauges produce a very small change in voltage which is amplified to produce a one to five volt signal. The one to five volt signal is then converted to a four to twenty milliamp signal which is compatible with industrial standards for electronic control and measuring devices. At rest, the signal produced is twelve milliamps. This is the mid point between four and twenty milliamps. A signal greater than twelve milliamps represents torque that is measured when the valve stem is rotated in a clockwise direction and a signal less than twelve milliamps represents torque measured when the stem is rotated in a counterclockwise direction.

It will thus be understood that the strain gauges 58 attached to the cylindrical section 56 of the body 22 of the torque/position transducer 20 generate an output signal which is indicative of the angular differentiation between the valve operator 40 and the valve 30 as the valve operator is actuated to either open or close the valve. Such measurement is in turn indicative of the operating condition of the valve. Thus, by monitoring the torque necessary to open or close the valve, the necessity of repair or replacement of the valve at a predetermined period of time can be determined.

The interlocking rings 24 of the torque/position transducer are best shown in FIGS. 6–9. A moving ring 70 is engaged with input lug 52 of the body 22 by means of a light press fit. Thus, the ring 70 is fixed to the lug 52 and is not permitted to rotate with respect thereto, but rather moves with the body 22.

Referring to FIG. 10, the ring 70 has an aperture 72 formed therein. The aperture 72 extends to an armored cable 74 which is used to carry leads 60 from the strain gauges 58 outwardly to circuitry connected thereto and adapted to process the voltage changes caused in the strain gauges 58 by the application of torque to the body 22. The aperture 72 and the armored cable 74 also direct electrical leads 75 to a infrared light generator 76 and an infrared light detector 78 mounted on the interior of the moving ring 70. The infrared light generator 76 directs infrared energy through an aperture 80 formed in the ring 70, and the infrared light receiver 78 receives reflected light received back through an aperture 82 form therein.

The moving ring 70 has a reduced diameter portion 84 extending downwardly therefrom. A fixed ring 86 is slidably received on the reduced diameter portion 84 of the moving ring 70 and has a lug 88 projecting therefrom. The interior of the ring 86 is provided with a foil layer 90.

Figure 8:
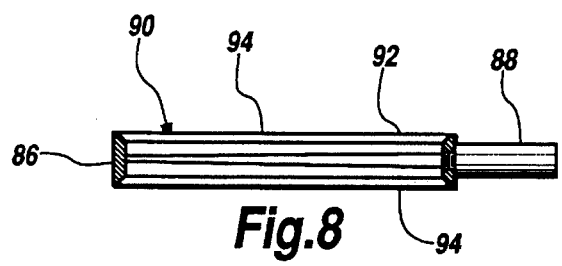
FIG. 8 is sectional view of a second interlocking ring of the torque/position transducer of FIG. 1.
Figure 5:
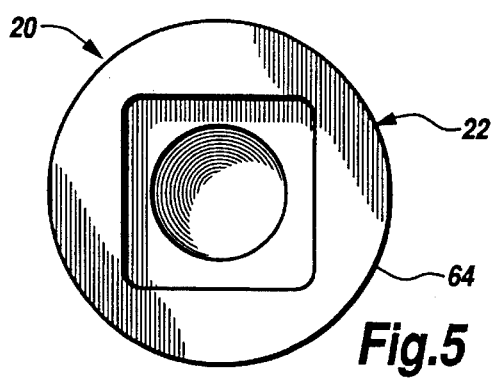
FIG. 5 is a bottom view of the body of the FIG. 2.
Figure 9:
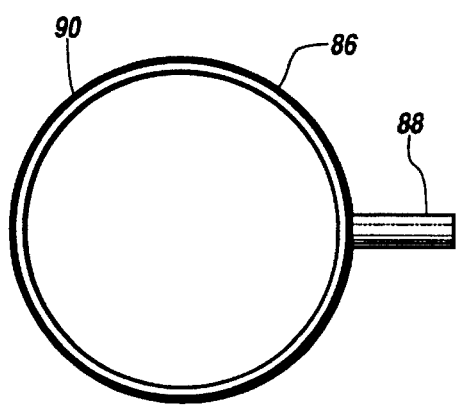
FIG. 9 is top view of the interlocking ring of FIG. 8.

As is best shown in FIG. 8, the foil layer 90 of the fixed ring 86 has a reflective portion 92. The reflective portion 92 and the a non-reflective portion 94 cooperate to form a divergent reflective surface on the interior of the fixed ring 86. Thus, the amount of infrared energy directed on the foil layer 90 from the source 76 and reflected back therefrom onto the receiver 78 is dependent on the relative positioning of the fixed ring 86 relative to the moving ring 70.

Referring again to FIG. 1, a bracket 100 extends downwardly from the valve operator 40 and into engagement with the lug 88 extending from the fixed ring 86. The bracket 100 functions to prevent the fixed ring 86 from rotation relative to either the valve 30 or the valve operator 40 in either direction. Since the moving ring 70 is secured to the input lug 52 of the body 22 of the torque/position transducer 20, it is constrained to movement therewith. Therefore, as the valve is opened or closed, the relative positioning of the ring 70 and the ring 86 is determined by the amount of infrared energy reflected back from the foil layer 90 of the fixed ring 86 to the receiver 78 mounted on the interior of the moving ring 70.

OPERATION

In the operation of the torque/position transducer 20, the valve operator 40 is actuated to either open or close the valve 30. Depending on the condition of the valve 30, significant lag may occur between the drive lug 46 and the valve stem 36, resulting in significant deformation of the body 22 of the torque/position transducer 20. Any deformation to the body 22 causes deflection of the strain gauges 58 which in turn generates an electrical output that is transferred to external circuitries through the aperture 72 and the armored cable 74 attached to the fixed ring 70.

As the valve operator 40 rotates the valve stem 36 to open or close the valve 30, the moving ring 70 moves with the valve body 20, while the fixed ring 86 is locked in place by the interengagement of the lug 88 with the bracket 100. Infrared energy generated by the generator 76 on the moving ring 70 is reflected onto the foil layer 90 and is reflected back therefrom to the receiver 78. The amount of energy reflected back to the receiver 78 is dependent on the amount of the reflective portion 92 of the foil layer 90 which is exposed from the energy from the generator 76. Thus, the receiver 78 provides an output indicative of the positioning of the valve 30 at the time that any particular torque output is recorded.

Although preferred embodiments of the invention have been illustrated in the accompanying Drawings and described in the foregoing Detailed Description, it will be understood that the invention is not limited to the embodiments disclosed, but is capable of numerous rearrangements and modifications without departing from the spirit of the invention.

We claim:

1. An apparatus for determining the torque applied by a valve actuator to a valve stem, said valve having a valve stem with a valve stem input lug, said valve actuator having a valve actuator output lug, said apparatus for determining the applied torque comprising:

A. a rotatable body having:

an upper input lug mated to the valve actuator output lug, a lower output lug mated to the valve stem input lug, and a cylindrical central body portion connecting the upper input lug and the lower output lug;

B. at least one strain gauge mounted on said cylindrical central body portion; and C. means responsive to the output signal from said strain gauge for generating a signal indicative of the torque applied to the valve by the valve operator.

2. The apparatus for determining the torque applied by a valve actuator to a valve stem of claim 1 wherein a plurality of strain gauges are mounted at spaced points on a periphery of the central cylindrical body and arranged at an angle with respect to a central axis of the central cylindrical body.

3. The apparatus for determining the torque applied by a valve actuator to a valve stem of claim 2 further including circuitry to combine and average the output of the plurality of strain gauges and output a torque signal indicative of the torque applied by the valve actuator to the valve stem.

4. An apparatus for determining the position of a valve stem with respect to a valve being operated responsive to a valve actuator, said valve having a fixed valve body, a rotatable valve stem attached to a valve stem input lug, said valve actuator having a valve actuator output lug, said apparatus for determining the position of a valve stem comprising:

A. a rotatable body including:
an upper input lug mated to the valve actuator output lug,
a lower output lug mated to the valve stem input lug, and
a cylindrical body portion connecting the upper input lug and the lower output lug;

B. a first ring secured to said cylindrical body portion for rotation therewith, said first ring thereby fixed with respect to the valve stem, said first ring including:
an exterior side disposed away from the cylindrical body,
an infrared light generator mounted on the exterior side of the first ring, and
an infrared light receiver mounted on the exterior side of the first ring;

C. a second ring encircling a portion of the first ring, said ring fixed with respect to the valve, said first ring capable of rotation with respect to said first ring, said second ring including:
an interior side disposed toward the first ring,
a reflective surface on the interior side of the second ring, and
a non-reflective surface on the interior side of the second ring; and D. means response for determining the relative positioning of the first ring with respect to the second ring dependent on the amount of infrared light supplied by the infrared light generator, the amount of reflective surface, and the amount of light received by the infrared light receiver,
wherein said relative positioning of the first ring with respect to the second ring is the relative positioning of the valve stem with respect to the valve.

5. The apparatus for determining the position of a valve stem with respect to a valve of claim 4 wherein the second ring is rotatably received on a reduced diameter portion of the first ring.

6. An apparatus for determining the torque applied by a valve actuator to a valve stem at a particular position of the valve stem with respect to the valve, said valve having a fixed valve body, a rotatable valve stem attached to a valve stem input lug, said valve actuator having a valve actuator output lug, said apparatus for determining the position comprising:

A. a rotatable body having:
an upper input lug mated to the valve actuator output lug,
a lower output lug mated to the valve stem input lug, and
a cylindrical body portion connecting the upper input lug and the lower output lug;

B. at least one strain gauge mounted on said cylindrical central body portion;

C. means response to the output signal from said strain gauge for generating a signal indicative of the torque applied to the valve by the valve operator;

D. a first ring secured to said cylindrical body portion for rotation therewith, said first ring thereby fixed with respect to the valve stem, said first ring including:
an exterior side disposed away from the cylindrical body,
an infrared light generator mounted on the exterior side of the first ring, and
an infrared light receiver mounted on the exterior side of the first ring;

E. a second ring encircling a portion of the first ring, said ring fixed with respect to the valve, said first ring capable of rotation with respect to said first ring, said second ring including:
an interior side disposed toward the first ring,
a reflective surface on the interior side of the second ring, and
a non-reflective surface on the interior side of the second ring; and F. means response for determining the relative positioning of the first ring with respect to the second ring dependent on the amount of infrared light supplied by the infrared light generator, the amount of reflective surface area, and the amount of light received by the infrared light receiver,
wherein said relative positioning of the first ring with respect to the second ring is the relative positioning of the valve stem with respect to the valve.

* * * * *